(12) United States Patent
Nachefski (10) Patent No.: US 9,696,196 B2
(45) Date of Patent: Jul. 4, 2017

(54) SEALABLE ENGINE FLUID MEASUREMENT PROBE

(71) Applicant: William S. Nachefski, Katy, TX (US)

(72) Inventor: William S. Nachefski, Katy, TX (US)

( * ) Notice: Subject to any disclaimer, the term of this patent is extended or adjusted under 35 U.S.C. 154(b) by 118 days.

(21) Appl. No.: 14/866,496

(22) Filed: Sep. 25, 2015

(65) Prior Publication Data

US 2016/0349093 A1 Dec. 1, 2016

Related U.S. Application Data

(63) Continuation of application No. 62/167,427, filed on May 28, 2015.

(51) Int. Cl.
*G01F 23/04* (2006.01)

(52) U.S. Cl.
CPC .................... *G01F 23/04* (2013.01)

(58) Field of Classification Search
CPC ........................................................ G01F 23/04
USPC ................................... 33/721–731
See application file for complete search history.

(56) References Cited

U.S. PATENT DOCUMENTS

| | | | | |
|---|---|---|---|---|
| 2,782,514 A * | 2/1957 | Scott | ........................ | G01F 23/04 33/717 |
| 4,596,141 A * | 6/1986 | Kondo | .................. | G01F 23/241 33/722 |
| 4,941,268 A * | 7/1990 | Tausk | ....................... | G01F 23/04 116/227 |
| 2003/0150125 A1* | 8/2003 | Dougherty | .............. | G01F 23/04 33/722 |
| 2005/0241171 A1* | 11/2005 | Oyama | .................... | G01F 23/04 33/722 |
| 2011/0061254 A1* | 3/2011 | Armistead | ............. | A43C 7/005 33/725 |
| 2013/0305552 A1* | 11/2013 | Krishnamurthy | ....... | G01F 23/04 33/728 |
| 2016/0178424 A1* | 6/2016 | Martin | .................... | G01F 23/04 33/722 |

* cited by examiner

*Primary Examiner* — G. Bradley Bennett
(74) *Attorney, Agent, or Firm* — Howard L. Speight, PLLC (57) ABSTRACT

The present embodiments include assemblies and methods for releasably sealing a dipstick tube with a piston valve assembly in a sealable engine fluid measurement probe assembly. In an embodiment, the piston valve assembly is integrated in a handle portion of the sealable engine fluid measurement probe assembly. The seal may be established with an o-ring positioned on an outer diameter of a portion of the sealable engine fluid measurement probe assembly that is configured to be inserted into the dipstick tube. A port or opening on either side of the o-ring is coupled to the piston valve, or other equivalent valve assembly, for allowing air or other gases to bypass the o-ring, thereby releasing the seal between the sealable engine fluid measurement probe assembly and the dipstick tube.

20 Claims, 12 Drawing Sheets

SEALABLE ENGINE FLUID MEASUREMENT PROBE

CROSS-REFERENCE TO RELATED APPLICATIONS

This disclosure claims priority of U.S. Provisional Pat. App. No. 62/167,427 entitled "Sealable Dipstick For Accurate Oil Level Measurement" filed on May 28, 2015, the entirety of which is incorporated herein by reference.

FIELD

This disclosure relates generally to automotive components, and more specifically, to a sealable engine fluid measurement probe.

BACKGROUND

Car enthusiast typically try to protect their automotive investments, particularly when the investment is a high-end or high-performance sports car. A turbo charged engine requires more maintenance and vigilance than most other engines. With a turbo charged motor, one must frequently check the oil levels. Automotive dealers typically recommend an oil check at every gasoline fill up. This is due to the fact that turbo charged engines experience more "blow by" than normally aspirated cars, and can consume quite a bit more oil. Even if the motor is otherwise healthy, it is not uncommon to burn between a half to a full quart of oil between oil change intervals. Running this low on oil at the wrong time could result in catastrophic engine failure.

A common engine oil dipstick consists of a long small diameter tube (~0.5") that sits perpendicular to the oil pan, and rises from inside the oil pan upwards toward the top of the motor, usually terminating at a convenient easy to reach spot. The dipstick itself, normally nothing more than a long piece of spring steel with a handle sits inside this tube, allows a portion of the stick to make contact with the oil in the oil pan. The stick length is designed so that the oil level in the pan can be determined by seeing where oil is deposited on the stick. Dipsticks usually have some kind of graduated markings on them that correlate to high or low readings.

Many modern automobiles utilize a sealed dipstick handle configuration. A sealed dipstick handle typically has a grove on the outside diameter and an o-ring that sits in the groove. When the dip stick is inserted into the tube, and the handle is seated in its normal position, the o-ring seals off the dipstick tube from the outside environment, effectively keeping anything from getting in or out of the dipstick tube that leads to the oil pan.

The problem with previous sealed systems is that when the dipstick is pulled out of its tube (to check the oil level) the o-ring and handle material form a piston of sorts, and this piston pulls a vacuum up thru the tube. Minute as this force is, it is enough to skew the dipsticks readings by a wide margin, even as much as twenty percent. This can be verified by wiping the dipstick clean and reinserting and rechecking the results. Consequently, it can be difficult to read where exactly the oil level is on the dipstick. Additionally, one side of the dipstick will have a higher mark than the other. Another problem is that the readings are very inconsistent.

One previous cure for such problems is to remove the o-ring from the dipstick handle prior to checking the oil. When the dipstick is re-inserted without the o-ring, air is able to pass around the body of the handle into the tube, and the measurements are more consistent. Once the measurement is complete, the o-ring must be reinstalled on the dipstick to avoid oil contamination. Although this process works, it is time consuming and usually results in damaged o-rings. For example, repeated removal and replacement of o-rings can tear them, or otherwise damage them.

SUMMARY

Embodiments of a measurement probe assembly are described herein. In one embodiment, the measurement probe assembly comprises a measurement probe configured to be extended into a component of an engine assembly for measurement of engine fluids, and a sealable valve assembly coupled to the measurement probe. The sealable valve assembly may include a sealing member configured to engage a portion of the engine assembly and configured to seal internal components of the engine assembly off when the sealable valve assembly is engaged with the portion of the engine assembly, a first vent port disposed on a first portion of the sealable valve assembly that is proximate to the internal components of the engine when the sealable valve assembly is engaged, a second vent port disposed on a second portion of the sealable valve assembly that is distal to the internal components of the engine when the sealable valve assembly is engaged, and a releasable valve disposed between the first vent port and the second vent port, the releasable valve configured to connect the first vent port to the second vent port in a first position, and to isolate the first vent port from the second vent port in a second position.

In a further embodiment, the measurement probe assembly includes a second sealing member configured to isolate the first vent port from the second vent port when the releasable valve is operated in the second position. The measurement probe assembly may also include an actuator coupled to the releasable valve, the actuator configured to cause the releasable valve to operate between the first position and the second position.

In a further embodiment, the measurement probe assembly the actuator comprises a plunger assembly. The plunger assembly further may include operating linkage coupled to a plunger handle, the operating linkage configured to operate the second sealing member. In an alternative embodiment, the actuator comprises a push-button assembly, wherein the push-button is configured to operate the releasable valve between the first position and the second position. Alternatively, the actuator comprises a twist actuator, wherein the twist actuator is configured to operate the releasable valve between the first position and the second position.

In an embodiment, the measurement probe assembly may include a bias member configured to bias the releasable valve in the second position. The bias member may be a spring. The measurement probe assembly may also include a handle coupled to the sealable valve assembly, the handle configured to facilitate placement and removal of the measurement probe relative to the engine assembly.

A system is also disclosed. In an embodiment, the system includes an engine assembly. The system may also include a measurement probe assembly. The measurement probe assembly may include a measurement probe configured to be extended into a component of the engine assembly for measurement of engine fluids. Additionally, the measurement probe assembly may include a sealable valve assembly coupled to the measurement probe, a sealing member configured to engage a portion of the engine assembly and configured to seal internal components of the engine assembly off when the sealable valve assembly is engaged with the portion of the engine assembly, a first vent port disposed on a first portion of the sealable valve assembly that is proximate to the internal components of the engine when the sealable valve assembly is engaged, a second vent port disposed on a second portion of the sealable valve assembly that is distal to the internal components of the engine when the sealable valve assembly is engaged, and a releasable valve disposed between the first vent port and the second vent port, the releasable valve configured to connect the first vent port to the second vent port in a first position and to isolate the first vent port from the second vent port in a second position.

A method is also disclosed. In an embodiment, the method includes actuating a sealable valve assembly of a measurement probe assembly into a first position, such that a first vent port and a second vent port of the measurement probe assembly are in fluid communication. The method may also include inserting a measurement probe into a component of an engine assembly. Additionally, the method may include actuating the sealable valve assembly of the measurement probe assembly into a second position, such that the first vent port and the second vent port of the measurement probe assembly are isolated.

In a further embodiment, the method includes establishing a seal between a sealing member of the measurement probe assembly and a portion of the engine assembly. Additionally, the method may include actuating the sealable valve assembly of the measurement probe assembly into a second position, such that a first vent port and a second vent port of the measurement probe assembly are in fluid communication, and removing the measurement probe from the component of the engine assembly.

In one embodiment, actuating the sealable valve assembly of the measurement probe assembly may include operating an actuator coupled to a releasable valve, the actuator configured to cause the releasable valve to operate between the first position and the second position. Alternatively, actuating the sealable valve assembly of the measurement probe assembly into the second position includes releasing an actuator to allow a bias member to operate the sealable valve assembly into the second position. In another embodiment, actuating the sealable valve assembly comprises operating a plunger assembly. In still another embodiment, actuating the sealable valve assembly comprises operating a push-button assembly. Actuating the sealable valve assembly may include operating a twist actuator. In a further embodiment, actuating the sealable valve assembly includes operating a second sealing member configured to isolate the first vent port from the second vent port when the releasable valve is operated in the second position.

BRIEF DESCRIPTION

The following drawings form part of the present specification and are included to further demonstrate certain aspects of the present invention. The invention may be better understood by reference to one or more of these drawings in combination with the detailed description of specific embodiments presented herein.

DETAILED DESCRIPTION

Various features and advantageous details are explained more fully with reference to the nonlimiting embodiments that are illustrated in the accompanying drawings and detailed in the following description. Descriptions of well-known starting materials, processing techniques, components, and equipment are omitted so as not to unnecessarily obscure the invention in detail. It should be understood, however, that the detailed description and the specific examples, while indicating embodiments of the invention, are given by way of illustration only, and not by way of limitation. Various substitutions, modifications, additions, and/or rearrangements within the spirit and/or scope of the underlying inventive concept will become apparent to those skilled in the art from this disclosure.

The present embodiments include assemblies and methods for releasably sealing a dipstick tube with a piston valve assembly in a sealable engine fluid measurement probe assembly. In an embodiment, the piston valve assembly is integrated in a handle portion of the sealable engine fluid measurement probe assembly. The seal may be established with an o-ring positioned on an outer diameter of a portion of the sealable engine fluid measurement probe assembly that is configured to be inserted into the dipstick tube. A port or opening on either side of the o-ring is coupled to the piston valve, or other equivalent valve assembly, for allowing air or other gases to bypass the o-ring, thereby releasing the seal between the sealable engine fluid measurement probe assembly and the dipstick tube.

Embodiments of a sealable dipstick for accurate oil level measurement are described. In an embodiment, the dipstick includes a handle having a spring loaded piston valve that is actuated by pulling up on a plunger. Additionally, the dipstick includes two internal vent ports, one above an outer diameter o-ring and one below.

In an embodiment, the valve piston seals are oriented so that when in a closed position they sealed off the internal vent ports from one another, and when pulled up into an open position they allowed the ports to have air flow through them.

Considerations had to be made so that no foreign contaminants could not work their way into the motors oil pan via the dipstick tube. The seals are designed such that anything that could accumulate on the top seal will never make its way to the bottom seal or beyond. All fluids would automatically vent out of the top exposed vent port.

Figure 1:
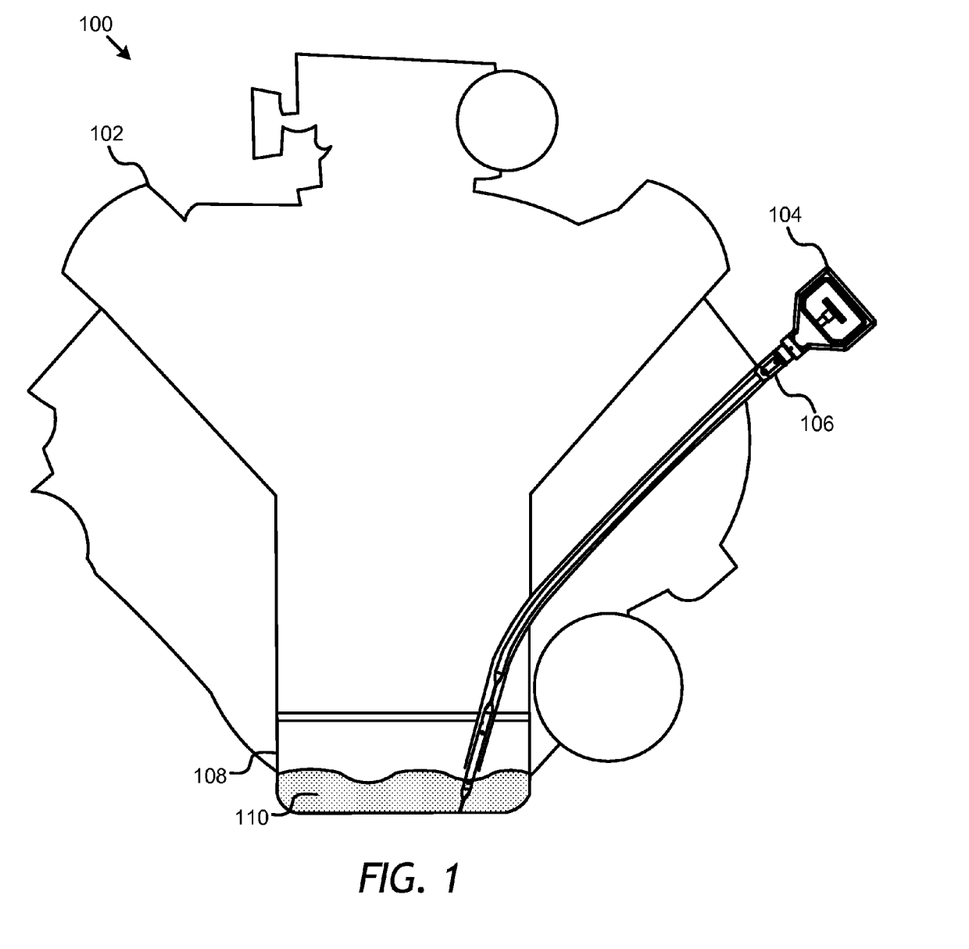
FIG. 1 is a cross-section diagram illustrating one embodiment of system with a sealable engine fluid measurement probe.

FIG. 1 is a cross-section diagram illustrating one embodiment of system 100 with a sealable engine fluid measurement probe 104. In an embodiment, the system 100 includes an engine assembly 102. The engine assembly 102 may include the engine block with internal components, such as cams, pistons, valves, gears, etc. Additionally, the engine assembly 102 may include various engine fluid reservoirs, including for example, an oil pan 108 for containing engine oil 110. The engine assembly 102 may include pumps for pumping the engine oil to various components of the engine assembly 102. The oil, or other engine fluids, may reduce wear and tear on the engine, and facilitate proper operation of the engine assembly 102.

As used herein the term "engine assembly" may refer to an entire drivetrain, including gear boxes, transmissions, and the like. Indeed, the term engine assembly may include additional peripheral components, including braking systems and other hydrologic systems, fuel systems, windscreen washer systems, and the like. The present embodiments may be used in accordance with a variety of such systems for checking and maintaining proper engine fluid levels. Engine fluids include, but are not limited to, engine oil, transmission or gear fluid, hydraulic fluid, washer fluid, etc.

One of ordinary skill will recognize that the present embodiments may be incorporated with a variety of engine drive systems, including automobile systems, aircraft systems, nautical craft systems, etc. One of ordinary skill may recognize other power-driven systems for which the present embodiments may be suitable, including engine-driven power generators, stand-along engine driven devices such as power washers, oil drilling rigs, etc. Indeed, one of skill will recognize that the present embodiments may be adapted for use in other fluid-driven systems, including hydraulic pump systems, air-conditioning systems, etc.

As illustrated in FIG. 1, a measurement probe assembly 104 may be inserted into a portion of the engine assembly 102, such as through access port 106. The access port 106 may be a tube or hole through the engine block, oil pan, or other components of the engine assembly 102. In such an embodiment, a portion of the measurement probe assembly 104 may extend into the fluid reservoir, such as oil pan 108 for measurement of fluid levels, such as the level of engine oil 110.

In an embodiment, the measurement probe assembly 104 may form a seal with at least a portion of the access port 106, or other components of the engine assembly 102, to block contaminants from entering the engine assembly 102 through the access port 106. In such an embodiment, the seal formed by the measurement probe assembly 104 may be releasable, through actuation of components of the measurement probe assembly 104, as described below with reference to FIGS. 2-11.

Figure 2:
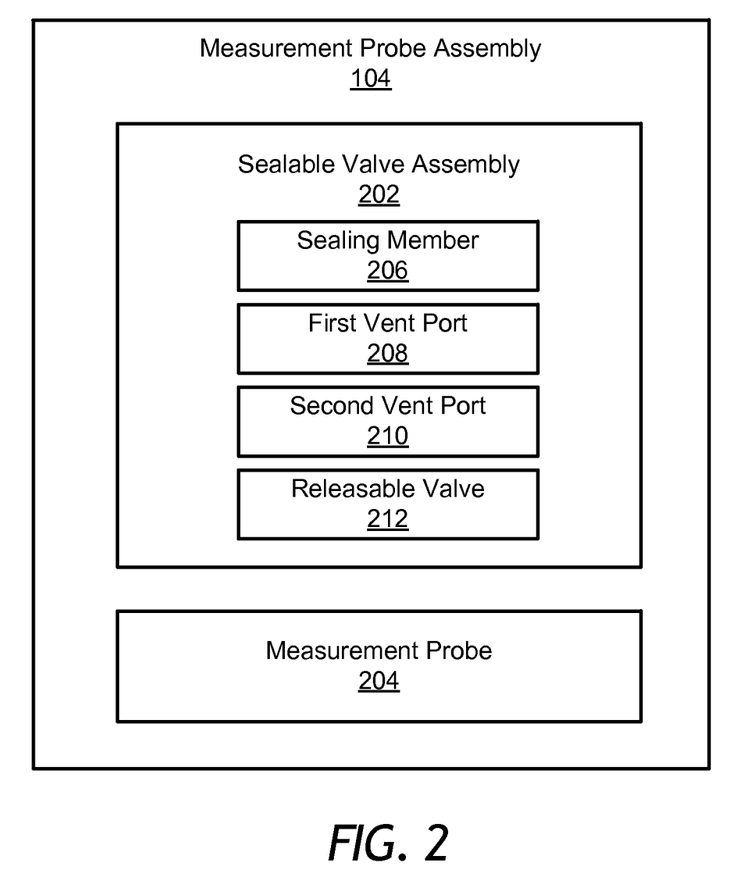
FIG. 2 is a schematic block diagram illustrating an embodiment of a sealable engine fluid measurement probe.

FIG. 2 is a schematic block diagram illustrating an embodiment of a sealable engine fluid measurement probe assembly 104. In an embodiment, the assembly 104 includes a sealable valve assembly 202 and a measurement probe 204. The sealable valve assembly 202 may be coupled to the measurement probe 204 in some embodiments. In an embodiment, the sealable valve assembly 202 includes a sealing member 206, a first vent port 208, a second vent port 210, and a releasable valve 212.

In an embodiment, the sealing member 206 may be an o-ring. In another embodiment, the sealing member 206 may be a gasket, bushing, or other suitable component for sealing an opening 106 in the engine assembly 102. The first vent port 208 and the second vent ports 210 may be holes, grooves, slots, or other ports through a body portion of the sealable valve assembly 202. In an embodiment, the sealing member 206 may be disposed between the first vent port 208 and the second vent port 210, such that the sealing member 206 isolates the internal components of the engine assembly 102 when the releasable valve 212 is in a first position. When the releasable valve 212 is in a second position, the pressure internal to the engine assembly 102 may be substantially equalized with the ambient environment by allowing air to flow from the first vent port 208 to the second vent port 210.

In various embodiments, the measurement probe 204 may be a dipstick. One of ordinary will recognize various embodiments of a dipstick, including those that include a rod, cable, wire, strip of material, or the like. Alternative measurement probes 204 may include thermometers or thermistors, pressure sensors, particulate concentration sensors, or the like. One of ordinary skill will recognize various embodiments of measurement probes, for which the present embodiments are suitable. For example, the measurement probe 204 may include a length of spring steal, wire cable, or other suitable material for extending a measurement probe into an oil pan 108 for measurement of oil levels in the oil pan 108. In an embodiment, the sealable engine fluid measurement probe assembly 202 may be inserted into a dipstick tube 106 of an automobile or other motor driven craft.

Figure 3:
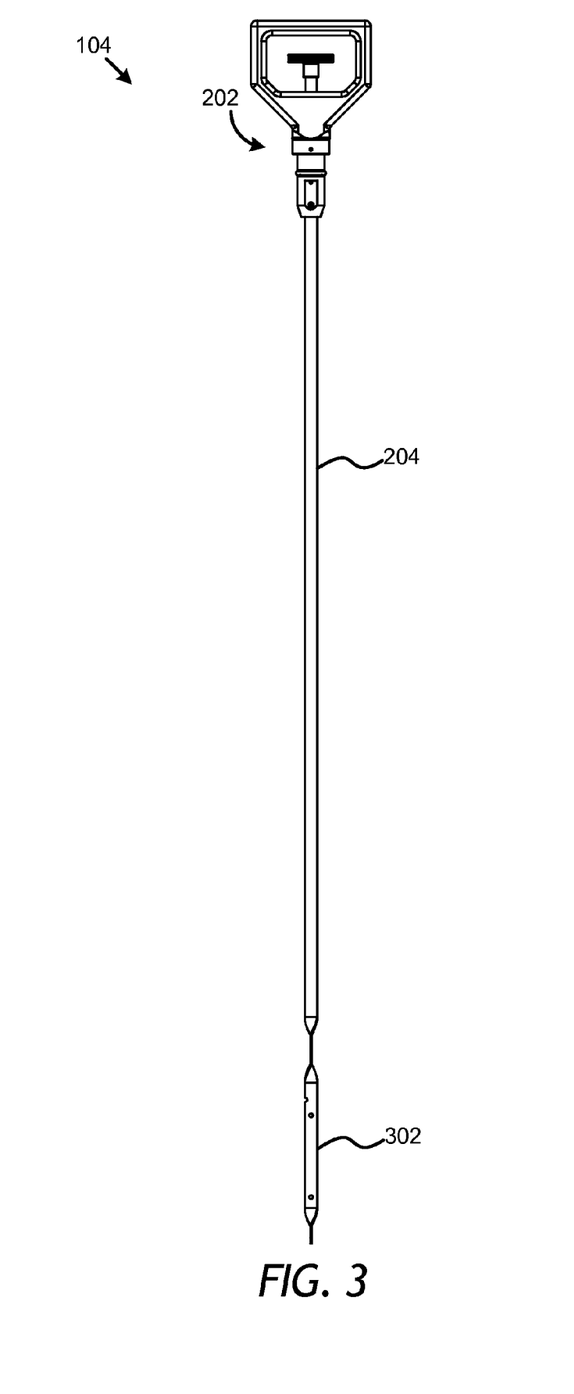
FIG. 3 is a front view diagram illustrating one embodiment of a sealable engine fluid measurement probe.

FIG. 3 is a front view diagram illustrating one embodiment of a sealable engine fluid measurement probe 104. The embodiment of FIG. 3 generally illustrates a dipstick device, but one of ordinary skill will recognize that the present embodiments may be used with other measurement probe devices. In the described embodiment, the sealable engine fluid measurement probe 104 includes a sealable valve assembly 202, which is further illustrated in FIGS. 4-11, and a measurement probe 204. In the embodiment of FIG. 3, the measurement probe 204 further comprises a graduated dipstick oil level measurement probe 302.

Figure 4:
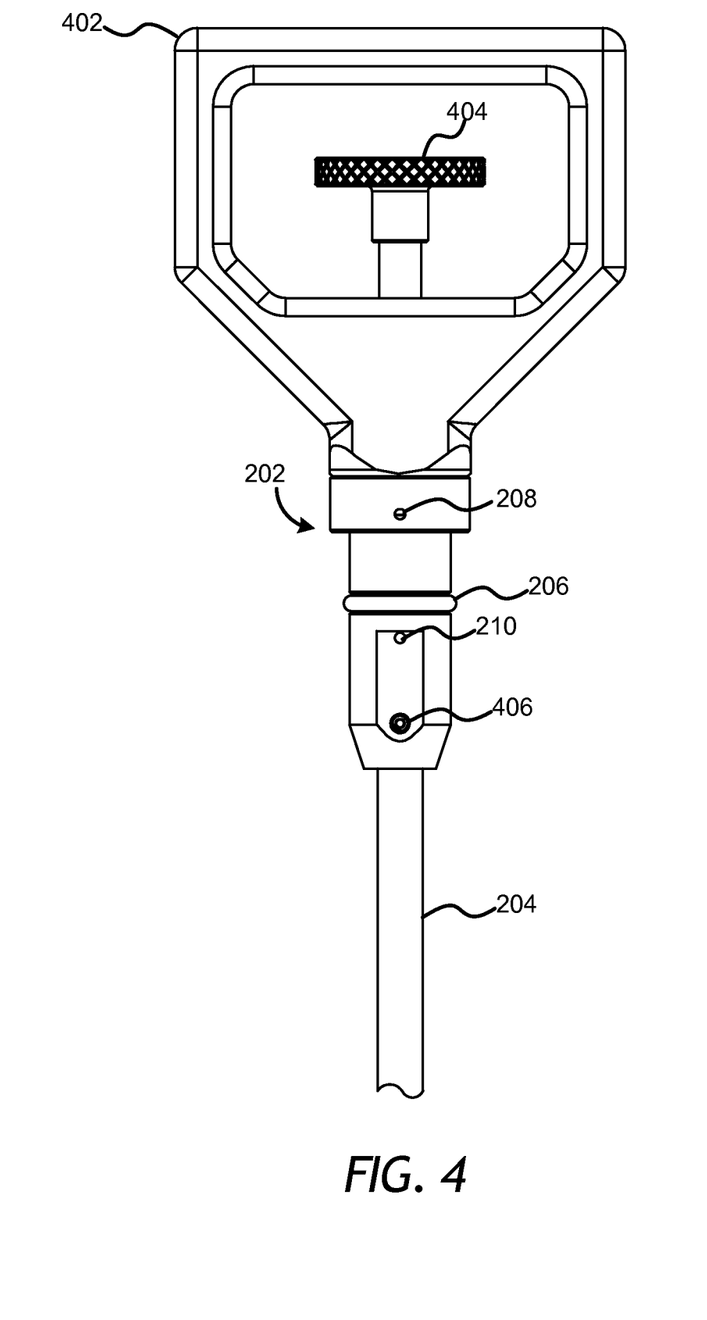
FIG. 4 is a front view diagram illustrating one embodiment of a sealable engine fluid measurement probe.

FIG. 4 is a front view diagram illustrating one embodiment of a sealable engine fluid measurement probe 104. In an embodiment, the sealable engine fluid measurement probe assembly 104 includes a handle 402 with an integrated sealable valve assembly 202. The handle 402 may be coupled to a measurement probe 204 with a set screw 406, or the like. In the depicted embodiment, the sealable valve assembly 202 may be operated by a plunger handle 404 to allow air to pass from the first vent port 208 past the sealing member 206 to the second vent port 210.

Figure 5:
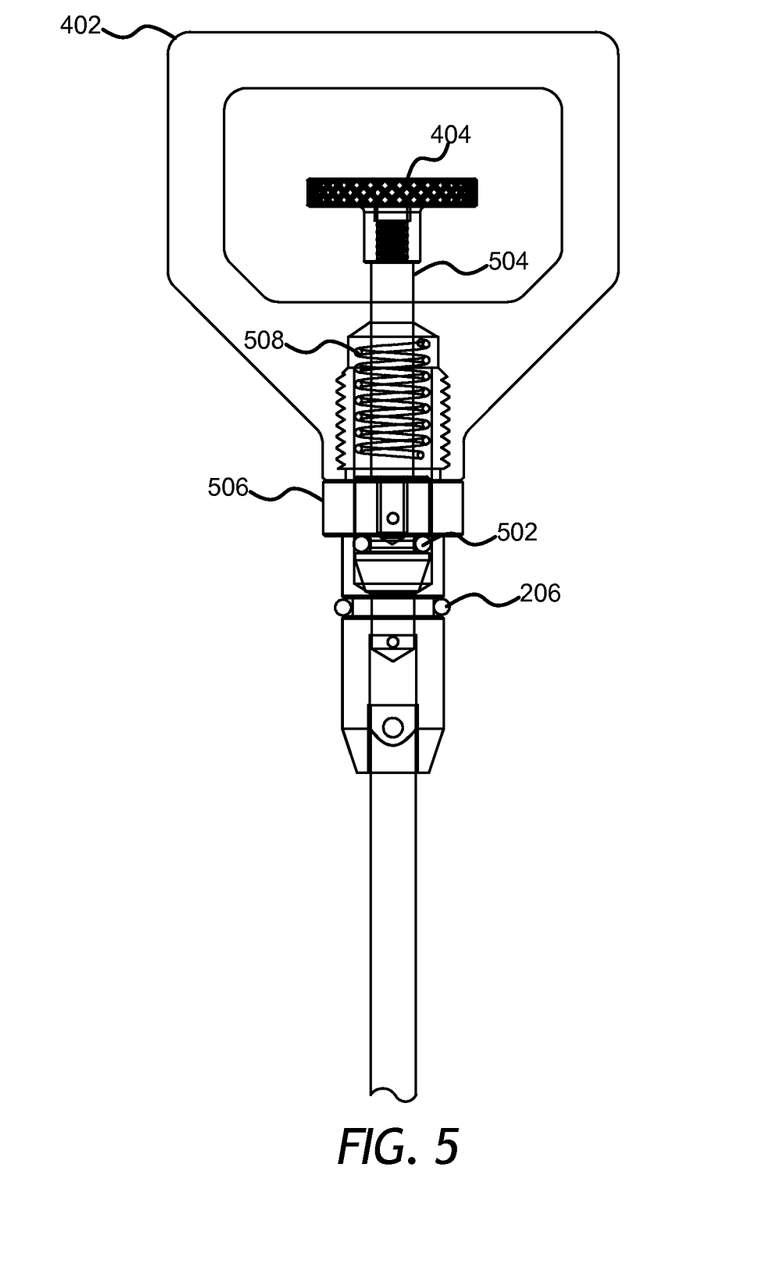
FIG. 5 is an internal view diagram illustrating further embodiments of a sealable engine fluid measurement probe.

FIG. 5 is an internal view diagram illustrating further embodiments of a sealable engine fluid measurement probe 104. In an embodiment, the handle 402 is coupled to a sealable valve assembly 202. In the depicted embodiment, the valve assembly 202 is a is a piston valve assembly, which includes a valve plunger handle 404, a valve linkage 504 which extends from the valve plunger handle 404 into the body of the handle 402. The assembly may also include a valve housing 506, with a first vent port 208 and a second vent port 210 on either side of a first sealing member 206, such as an o-ring. In an embodiment, a second sealing member 502 may be coupled to the piston. The second sealing member may isolate the first vent port 208 from the second vent port 210 when in a first position, and allow passage of air from the first vent port 208 to the second vent port, when operated into a second position. The assembly may also include a dipstick set screw 406 for adjusting the piston valve, and the dipstick 204 coupled to the dipstick handle 402 and/or piston valve assembly 206.

Figure 6:
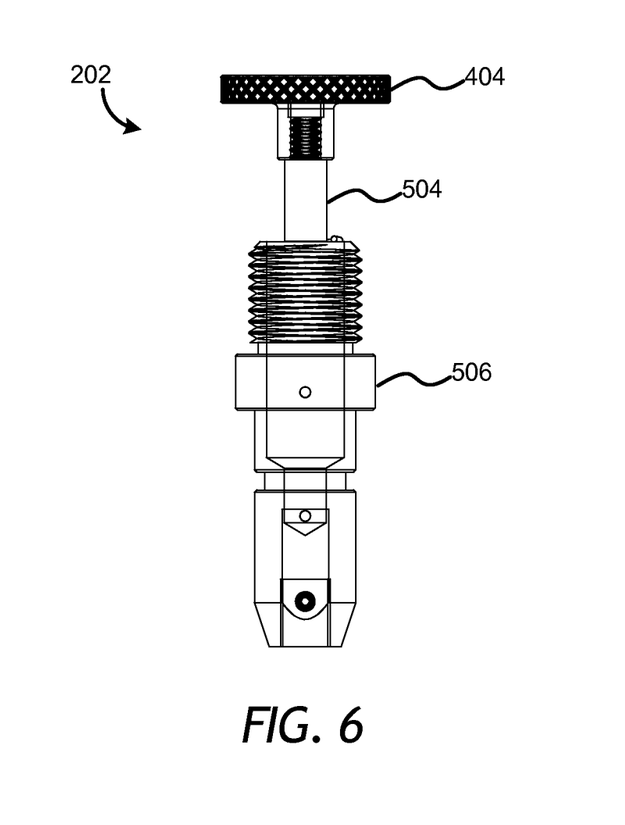
FIG. 6 is a front view diagram of a piston valve assembly according to an embodiment of a sealable engine fluid measurement probe.
Figure 7:
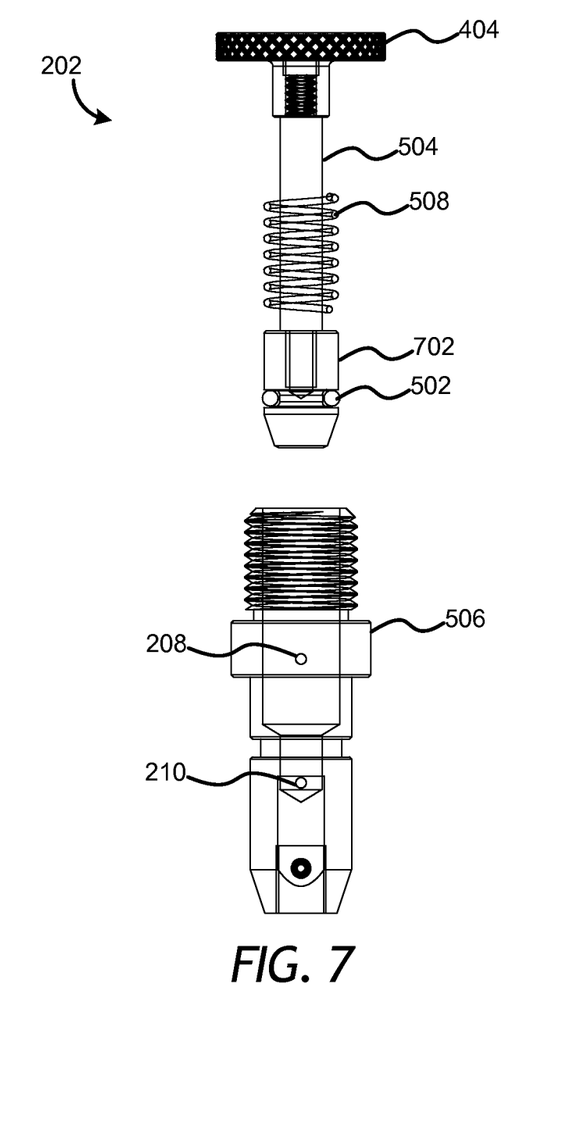
FIG. 7 is an expanded view diagram of a piston valve assembly according to aspects of a sealable engine fluid measurement probe.

FIG. 6 illustrates an embodiment of the internal components of an embodiment of a sealable valve assembly 202. The depicted embodiment is a piston valve assembly. FIG. 7 is an expanded view diagram of a piston valve assembly according to aspects of a sealable engine fluid measurement probe. In the embodiment of FIG. 7, a piston 702 may operate in the piston housing 506 between the first position and the second position. In such an embodiment, a bias member 508 may be provided to bias the piston in the second position, where the first vent port 208 is isolated from the second vent port 210. In an embodiment, the bias member 508 may be a spring. Alternatively, the bias member may be an elastic member, such as rubber, or plastic. One of skill will recognize that additional or alternative embodiments may be suitable for use as well.

Figure 8:
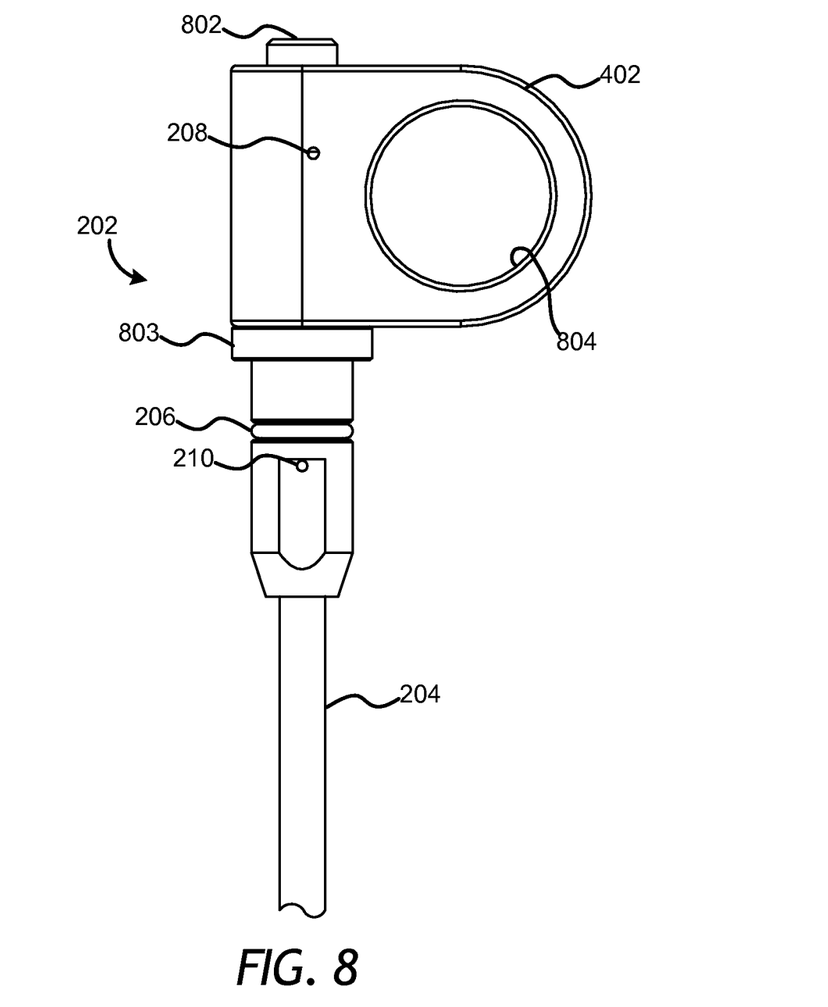
FIG. 8 is a front view diagram illustrating one embodiment of a sealable engine fluid measurement probe.

FIG. 8 is a front view diagram illustrating one embodiment of a sealable engine fluid measurement probe 104. In an embodiment, the sealable engine fluid measurement probe assembly 104 may include a finger hole 804 for inserting and extracting the sealable engine fluid measurement probe assembly 104 into a receiving port 106 of an engine assembly 102. A combination of the base 803 and the sealing member 206 may seal the receiving port 106 closed when the dipstick is fully inserted into the receiving port 106. Vent ports 208, 210 on either side of the sealing member 206 may release the seal between the sealable engine fluid measurement probe assembly 104 and the receiving port 106 of the engine assembly 102. The valve actuator button 802 may actuate an internal piston assembly for allowing gasses to pass between the two vent ports 208, 210.

Figure 9:
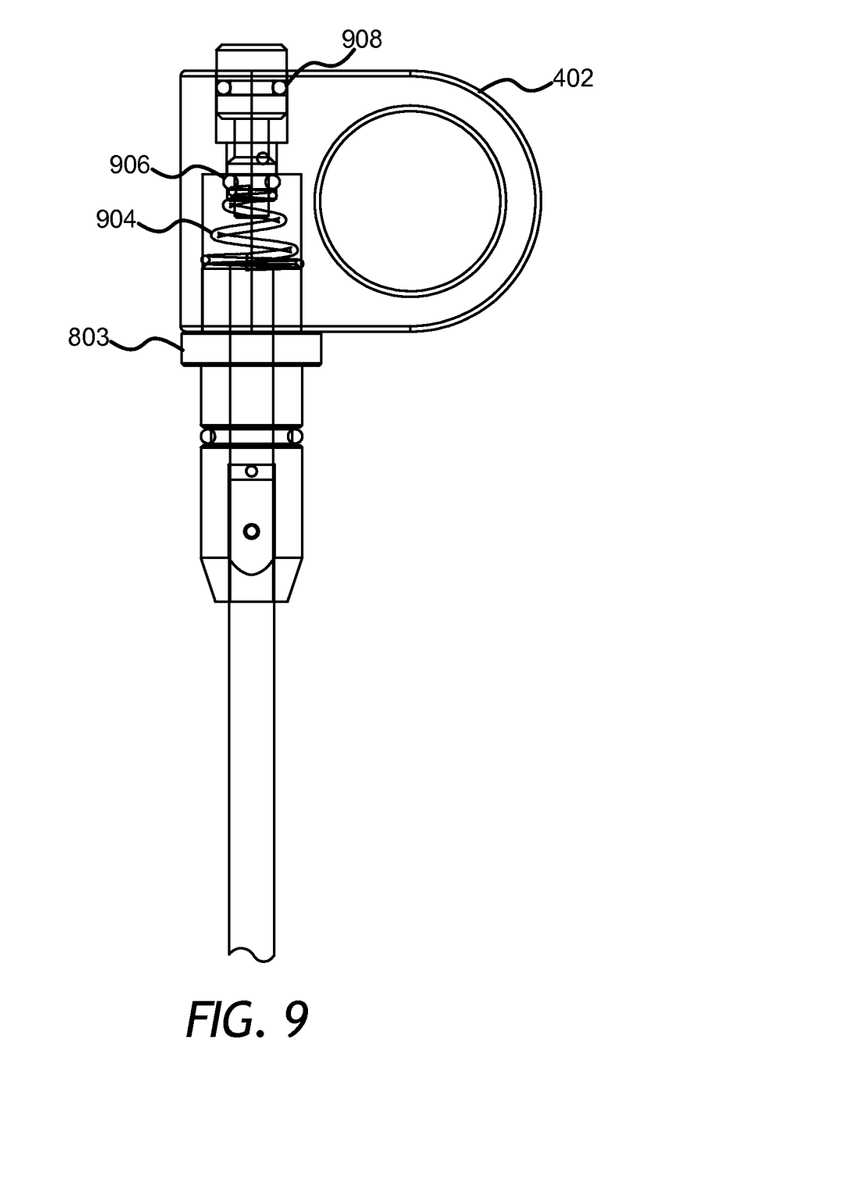
FIG. 9 is an internal view diagram illustrating further embodiments of a sealable engine fluid measurement probe.

FIG. 9 is an internal view diagram illustrating further embodiments of a sealable engine fluid measurement probe 104. In an embodiment, sealable engine fluid measurement probe assembly 104 includes a sealable valve assembly 202 for allowing gasses to pass between the two vent ports 208, 210 when actuated. The valve assembly 202 may include a valve upper seal 908 and a lower seal 906 for isolating the first vent port 208 when the valve 202 is in a closed position. The return spring 904 may be configured to bias the valve assembly 202 into the closed position. When the valve stem button 802 is depressed, the seal between the first vent port 208 and the second vent port 210 is broken and gases are able to pass through the body of the sealable engine fluid measurement probe assembly 104 for releasing the seal between the receiving port 106 and the sealable engine fluid measurement probe assembly 104.

Figure 10:
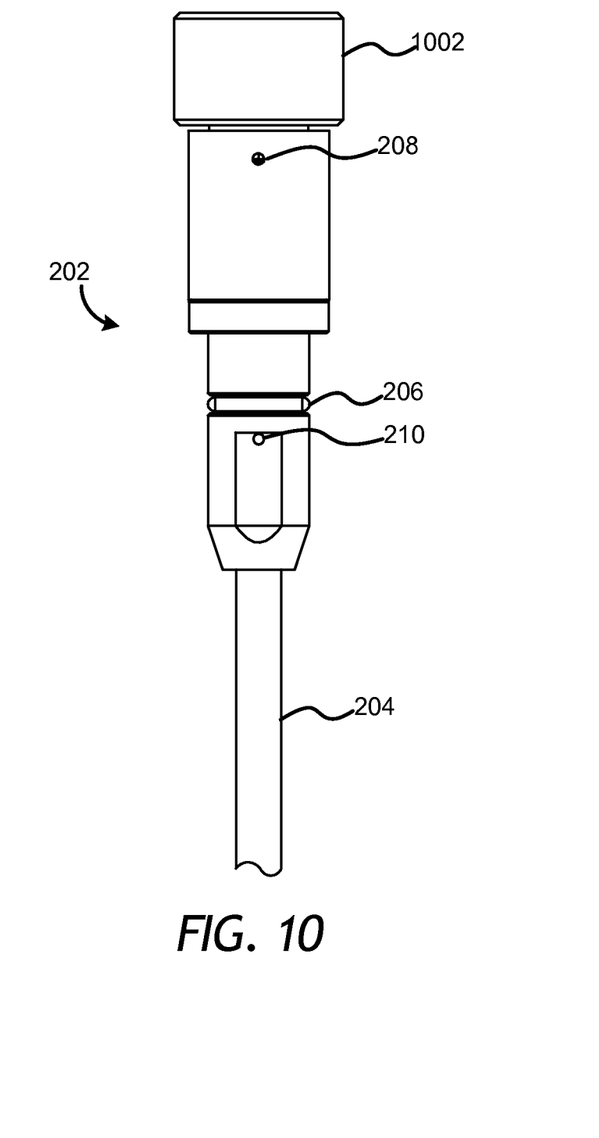
FIG. 10 is a front view diagram illustrating one embodiment of a sealable engine fluid measurement probe.

FIG. 10 is a front view diagram illustrating one embodiment of a sealable engine fluid measurement probe 104. The embodiment of FIG. 10 may include a twist action valve actuator 1002. The twist action valve actuator 1002 may be configured to release the seal between the first vent port 208 and the second vent port 210. The body and sealing member 206 may create a seal with the receiving port 106 of the engine assembly 102 until the valve 206 is twist actuated and the seal between the first vent port 208 and the second vent port 210 is broken.

Figure 11:
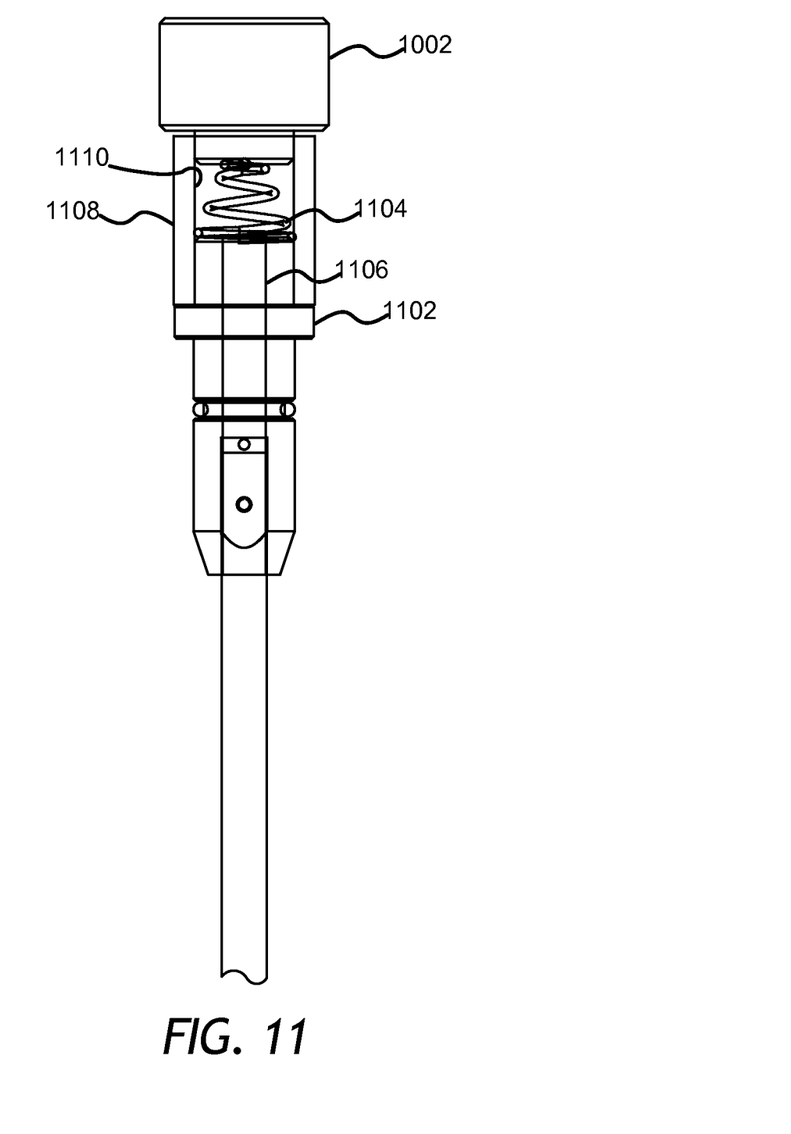
FIG. 11 is an internal view diagram illustrating further embodiments of a sealable engine fluid measurement probe.

FIG. 11 is an internal view diagram illustrating further embodiments of a sealable engine fluid measurement probe 104. In the embodiment of FIG. 11, the valve assembly 202 may include a valve spring 1104 configured to provide a torsional force on the valve assembly 202. The torsional force may bias the valve assembly 202 into a closed position. In an embodiment, the twist actuator 1002 may be rotated about a central axis for releasing the seal between the first vent port 208 and the second vent port 210. When the twist actuator 1002 is released, the valve spring 1104 may cause the valve assembly 202 to close and reestablish the seal between the first vent port 208 and the second vent port 210. For example, in an embodiment, the valve assembly 202 may include an outer body 1108 and an inner body 1110, where the inner body 1110 is configured to rotate about the axis inside the outer body. The seal may be released when a third vent port in the inner body 1110 is aligned with the first vent port 208 in the outer body 1108.

Figure 12:
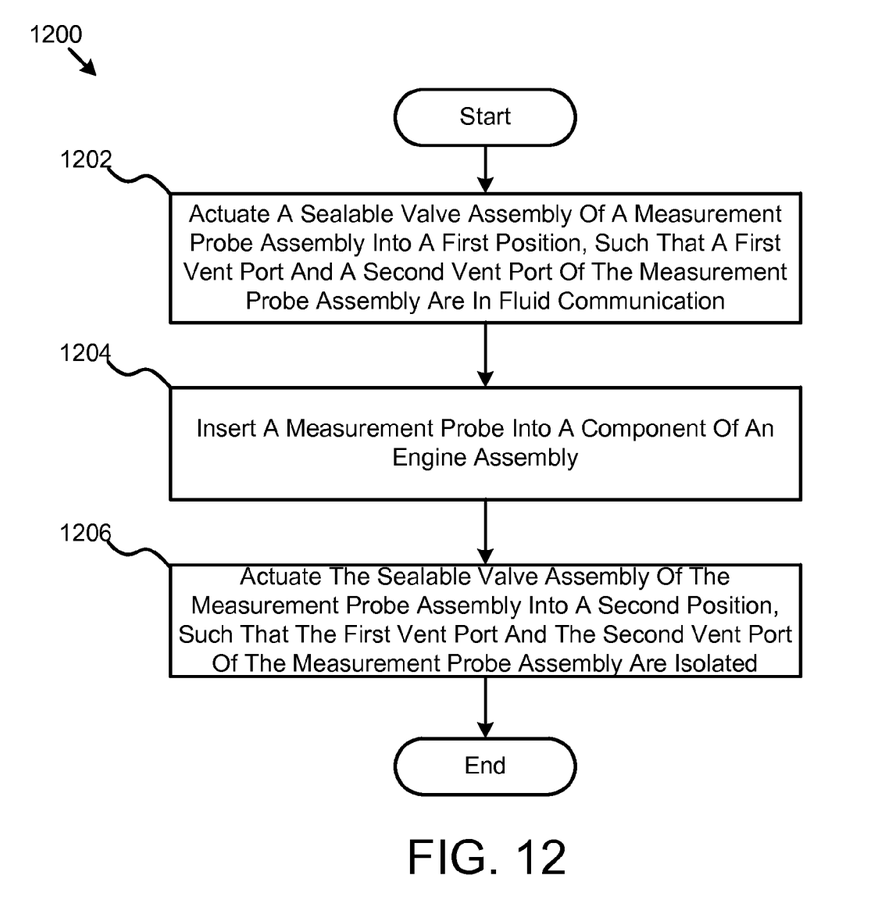
FIG. 12 is a flowchart diagram illustrating one embodiment of a method for using a sealable engine fluid measurement probe.

FIG. 12 is a flowchart diagram illustrating one embodiment of a method 1200 for using a sealable engine fluid measurement probe. In an embodiment, the method 1200 includes actuating a sealable valve assembly of a measurement probe assembly into a first position, such that a first vent port and a second vent port of the measurement probe assembly are in fluid communication, as shown at block 1202. The method 1200 further includes inserting a measurement probe into a component of an engine assembly, as shown at block 1204. At block 1206, the method includes actuating the sealable valve assembly of the measurement probe assembly into a second position, such that the first vent port and the second vent port of the measurement probe assembly are isolated.

In further embodiments, the method 1200 may include establishing a seal between a sealing member of the measurement probe assembly and a portion of the engine assembly. The method may also include actuating the sealable valve assembly of the measurement probe assembly into a second position, such that a first vent port and a second vent port of the measurement probe assembly are in fluid communication, and removing the measurement probe from the component of the engine assembly.

In various embodiments, actuating the sealable valve assembly of the measurement probe assembly includes operating an actuator coupled to a releasable valve, the actuator configured to cause the releasable valve to operate between the first position and the second position. Further, actuating the sealable valve assembly of the measurement probe assembly into the second position includes releasing an actuator to allow a bias member to operate the sealable valve assembly into the second position.

In an embodiment, actuating the sealable valve assembly comprises operating a plunger assembly. Alternatively, actuating the sealable valve assembly comprises operating a push-button assembly. In another embodiment, actuating the sealable valve assembly comprises operating a twist actuator. In such embodiments, actuating the sealable valve assembly comprises operating a second sealing member configured to isolate the first vent port from the second vent port when the releasable valve is operated in the second position.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A measurement probe assembly, comprising:
a measurement probe configured to be extended into a component of an engine assembly for measurement of engine fluids; and
a sealable valve assembly coupled to the measurement probe, the sealable valve assembly comprising:
a sealing member configured to engage a portion of the engine assembly and configured to seal internal components of the engine assembly off when the sealable valve assembly is engaged with the portion of the engine assembly;
a first vent port disposed on a first portion of the sealable valve assembly that is proximate to the internal components of the engine when the sealable valve assembly is engaged;
a second vent port disposed on a second portion of the sealable valve assembly that is distal to the internal components of the engine when the sealable valve assembly is engaged; and
a releasable valve disposed between the first vent port and the second vent port, the releasable valve configured to connect the first vent port to the second vent port in a first position, and to isolate the first vent port from the second vent port in a second position.

2. The measurement probe assembly of claim 1, further comprising a second sealing member configured to isolate the first vent port from the second vent port when the releasable valve is operated in the second position.

3. The measurement probe assembly of claim 1, further comprising an actuator coupled to the releasable valve, the actuator configured to cause the releasable valve to operate between the first position and the second position.

4. The measurement probe assembly of claim 3, wherein the actuator comprises a plunger assembly.

5. The measurement probe assembly of claim 4, wherein the plunger assembly further comprises an operating linkage coupled to a plunger handle, the operating linkage configured to operate the second sealing member.

6. The measurement probe assembly of claim 3, wherein the actuator comprises a push-button assembly, wherein the push-button is configured to operate the releasable valve between the first position and the second position.

7. The measurement probe assembly of claim 3, wherein the actuator comprises a twist actuator, wherein the twist actuator is configured to operate the releasable valve between the first position and the second position.

8. The measurement probe assembly of claim 1, further comprising a bias member configured to bias the releasable valve in the second position.

9. The measurement probe assembly of claim 8, wherein the bias member comprises a spring.

10. The measurement probe assembly of claim 1, further comprising a handle coupled to the sealable valve assembly, the handle configured to facilitate placement and removal of the measurement probe relative to the engine assembly.

11. A system comprising:
an engine assembly; and
a measurement probe assembly comprising:
a measurement probe configured to be extended into a component of the engine assembly for measurement of engine fluids; and
a sealable valve assembly coupled to the measurement probe, the sealable valve assembly comprising:
a sealing member configured to engage a portion of the engine assembly and configured to seal internal components of the engine assembly off when the sealable valve assembly is engaged with the portion of the engine assembly;
a first vent port disposed on a first portion of the sealable valve assembly that is proximate to the internal components of the engine when the sealable valve assembly is engaged;
a second vent port disposed on a second portion of the sealable valve assembly that is distal to the internal components of the engine when the sealable valve assembly is engaged; and
a releasable valve disposed between the first vent port and the second vent port, the releasable valve configured to connect the first vent port to the second vent port in a first position and to isolate the first vent port from the second vent port in a second position.

12. A method comprising:
actuating a sealable valve assembly of a measurement probe assembly into a first position, such that a first vent port and a second vent port of the measurement probe assembly are in fluid communication;
inserting a measurement probe into a component of an engine assembly; and
actuating the sealable valve assembly of the measurement probe assembly into a second position, such that the first vent port and the second vent port of the measurement probe assembly are isolated.

13. The method of claim 12, further comprising establishing a seal between a sealing member of the measurement probe assembly and a portion of the engine assembly.

14. The method of claim 12, further comprising:
actuating the sealable valve assembly of the measurement probe assembly into a second position, such that a first vent port and a second vent port of the measurement probe assembly are in fluid communication; and
removing the measurement probe from the component of the engine assembly.

15. The method of claim 12, wherein actuating the sealable valve assembly of the measurement probe assembly comprises operating an actuator coupled to a releasable valve, the actuator configured to cause the releasable valve to operate between the first position and the second position.

16. The method of claim 12, wherein actuating the sealable valve assembly of the measurement probe assembly into the second position comprises releasing an actuator to allow a bias member to operate the sealable valve assembly into the second position.

17. The method of claim 12, wherein actuating the sealable valve assembly comprises operating a plunger assembly.

18. The method of claim 12, wherein actuating the sealable valve assembly comprises operating a push-button assembly.

19. The method of claim 12, wherein actuating the sealable valve assembly comprises operating a twist actuator.

20. The method of claim 12, wherein actuating the sealable valve assembly comprises operating a second sealing member configured to isolate the first vent port from the second vent port when the releasable valve is operated in the second position.

* * * * *